US006908527B2

(12) United States Patent
Mann

(10) Patent No.: US 6,908,527 B2
(45) Date of Patent: Jun. 21, 2005

(54) IDENTIFICATION CARD

(75) Inventor: Gary M. Mann, West Chicago, IL (US)

(73) Assignee: Transilwrap Company, Inc., Franklin Park, IL (US)

( * ) Notice: Subject to any disclaimer, the term of this patent is extended or adjusted under 35 U.S.C. 154(b) by 584 days.

(21) Appl. No.: 10/091,702

(22) Filed: Mar. 6, 2002

(65) Prior Publication Data

US 2003/0168850 A1 Sep. 11, 2003

(51) Int. Cl.[7] .................... B29C 47/06; B32B 31/20; B32B 31/18; B41M 3/00; B42D 15/10

(52) U.S. Cl. .................... 156/244.11; 156/244.18; 156/247; 156/277; 156/289; 428/41.8; 428/42.1; 428/346; 428/914; 264/212; 283/75; 283/106

(58) Field of Search .................... 156/281, 238, 156/244.11, 244.18, 246, 247, 260, 277, 289; 427/208.2, 407.1; 428/40.1, 41.8, 42.1, 42.3, 200, 346, 352, 914; 264/164, 171.15, 171.21, 173.23, 173.16, 212; 283/75, 106

(56) References Cited

U.S. PATENT DOCUMENTS

| | | | | |
|---|---|---|---|---|
| 3,616,191 A | * 10/1971 | Fuerholzer et al. | 156/244.23 |
| 4,069,081 A | 1/1978 | Drower et al. | |
| 4,456,639 A | 6/1984 | Drower et al. | |
| 4,469,353 A | 9/1984 | Anarwala | |
| 4,540,612 A | * 9/1985 | Rhyner | 428/35.2 |
| 4,545,838 A | 10/1985 | Minkus et al. | |
| 4,589,942 A | 5/1986 | Korinek | |
| 4,722,376 A | 2/1988 | Rhyner | |
| 5,058,926 A | * 10/1991 | Drower | 283/109 |
| 5,090,736 A | 2/1992 | Minkus | |
| 5,489,356 A | 2/1996 | Drower | |
| 5,543,201 A | 8/1996 | Drower | |

FOREIGN PATENT DOCUMENTS

JP 04-018348 * 1/1992 .......... B32B/27/32

* cited by examiner

*Primary Examiner*—J. A. Lorengo
(74) *Attorney, Agent, or Firm*—Cook, Alex, McFarron, Manzo, Cummings & Mehler, Ltd.

(57) ABSTRACT

A method of making a printed identification card core, a printable sheet for manufacturing cores for laminated identification cards and a core for a laminated identification card. The method includes the steps of extruding polyethylene onto one side of a release film, laminating a porous, printable polyolefin film to the polyethylene side of the release film, die cutting the polyolefin film and the polyethylene film to form rectangular bodies each having a die cut transversely extending fold line dividing each of the rectangular bodies into two identically sized rectangular panels, printing on the porous, printable polyolefin film within said panels, removing a rectangular panel from the release sheet and folding the rectangular body about the fold line to locate the printed polyolefin surfaces on the exterior of the core. The core so manufactured can be inserted into a laminatable pouch and laminated to the core to form a tamper resistant identification card. The printable sheet includes a plastic sheet having a release surface on one side thereof, a layer of extruded polyethylene applied to the release surface of the plastic sheet, a layer of porous, printable polyolefin applied to the layer of extruded polyethylene and die cut panels formed in the layer of extruded polyethylene and the layer of porous, printable polyolefin. The core for the identification card includes an inner layer of polyethylene on each side of the core, a pair of layers of porous, printable polyolefin located outwardly of the inner layers of polyethylene and printed indicia on the outer faces of the layers of printable polyolefin.

2 Claims, 1 Drawing Sheet

IDENTIFICATION CARD

BACKGROUND AND SUMMARY OF THE INVENTION

This invention is directed to a printable sheet for manufacturing identification card cores, a core for an identification card and a method of making the same.

The unsettling events of recent months have increased the public's awareness of the importance of security. This increased awareness, in turn, has resulted in an increased demand for positive identification of employees, contractors' employees and visitors to public buildings, manufacturing plants, office buildings and institutions. Photo identification cards have long been used for positive identification of persons, especially identification cards that are tamper resistant and, therefore, are dependable.

For universal use, such tamper resistant identification cards should be relatively easy and inexpensive to manufacture using conventional reproduction equipment such as digital cameras, computers and printing equipment controlled by such computers, which printing equipment includes laser printers (color or black and white), inkjet printers or ALPS microdry color printers. The identification material thus produced should be susceptible to lamination in conventional laminating equipment.

Accordingly, an object of this invention is a carrier sheet of easily removable, printable panels which can be printed with identifying indicia and/or photographs of an individual and then removed from the carrier sheet and formed into a core having inner flexible, resilient layers and outer surfaces which carry identifying indicia as well as a photograph, either black and white or color.

Another object of this invention is a method of manufacturing a printable sheet for making cores for identification cards which method includes the steps of extruding a heat sensitive polyethylene adhesive on to one side of a release film, laminating a porous, printable polyolefin film to the polyethylene side of the release film so as to transfer the heat sensitive polyethylene adhesive to the polyolefin film and die cutting sets of removable panels through the laminated polyethylene and polyolefin films.

Yet another object of this invention is a method of manufacturing an identification card by inserting a printed resilient core into a laminatable pouch and then laminating the core and the pouch into a tamper resistant identification card.

Other objects and purposes of this invention will be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENT

Figure 1:
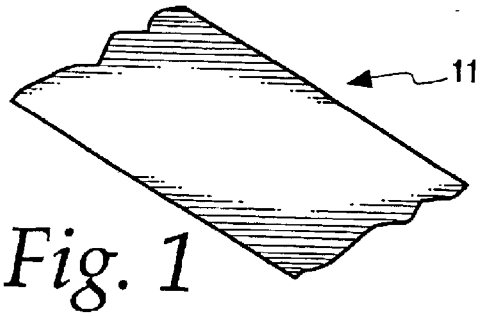
FIG. 1 is an orthographic view of a portion of a continuous laminated sheet used in manufacturing the core of this invention.
Figure 2:
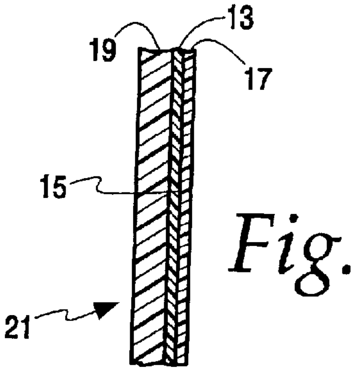
FIG. 2 is an enlarged, partial view of the cross section of the laminated sheet of FIG. 1 with the thickness of the sheet exaggerated for purposes of illustration.
Figure 3:
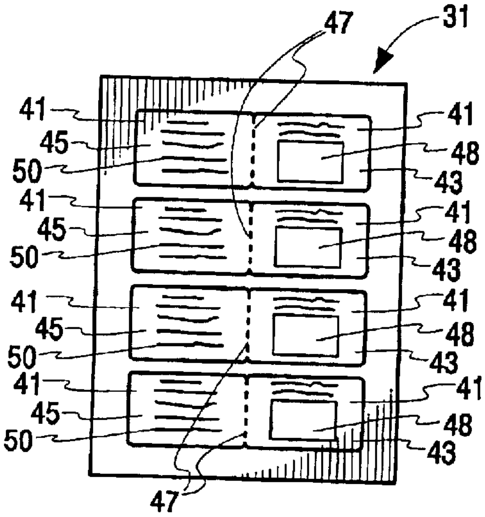
FIG. 3 shows a discrete sheet formed from the continuous sheet of FIG. 1 after printing of indicia and after die cutting the sheet into removable connected panels.

FIG. 1 of the drawing shows a continuous sheet 11 formed by extruding a heat sensitive polyethylene adhesive 13 onto one side 15 of a release film 17, as shown in FIG. 2. A porous, printable polyolefin film 19, such as the film sold under the trademark TESLIN by PPG Industries, Inc. of Pittsburgh, Pa., is laminated to the extruded polyethylene 13 to form a laminate sheet 21 with the polyethylene adhesive transferring to the polyolefin film.

Figure 4:
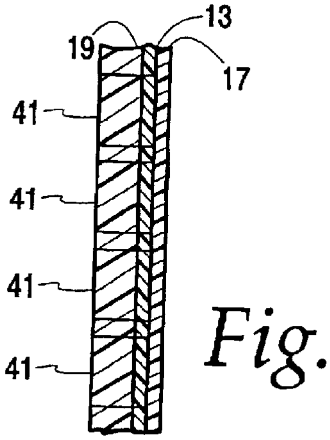
FIG. 4 is a cross sectional view of the discrete sheet of FIG. 3 with the thickness of the sheet exaggerated for purposes of illustration.

The laminate sheet 21 is cut into discrete sheets 31 which may be of letter or A-4 size or other dimensions suitable for use in conventional computer controlled printing printers such as laser printers, inkjet printers or ALPS microdry color printers. The discrete sheets 31 can then be die cut through the layers of polyolefin film 19 and polyethylene film 13 to form rectangular shaped bodies 41 suitable for receiving photos and text. Each body 41 consists of a pair of panels 43 and 45 connected by a fold line 47 which may be perforated or at least weakened. FIG. 4 of the drawings shows a portion of a vertical cross sectional view of the die cut discrete sheet 31 with the thickness exaggerated for clarity of illustration. The panels 43 and 45 are printed with photos 48 and text 50.

Figure 5:
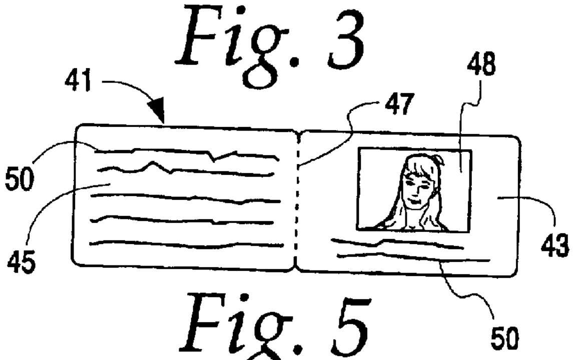
FIG. 5 is a planar view of a set of connected panels bearing printed indicia and text with the panels removed from the discrete sheet of FIG. 3.
Figure 6:
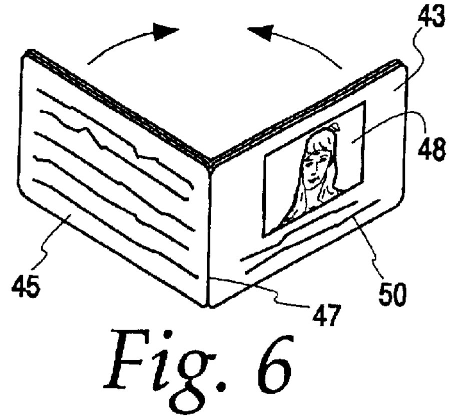
FIG. 6 is an orthographic view of the connected panels of FIG. 5 being folded to form a core in which the indicia and text bearing faces are located on the exterior of the folded core.

FIG. 5 of the drawings shows the rectangular shaped body 41 removed from the discrete sheet 31 prior to folding as shown in FIG. 6 in which the panels 43 and 45 are folded towards each other in the direction of the arrows to bring the release film 17 of each panel into contact with each other and placing the photo 33 and text 35 on the exterior outside surfaces of the resultant core 51.

Figure 7:
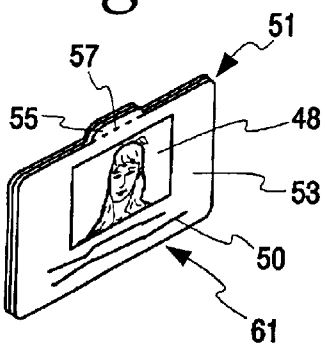
FIG. 7 is an orthographic view of the core of FIG. 6 inserted into a laminating pouch of the butterfly type prior to final lamination.

As shown in FIG. 7 of the drawings, the core 51 is inserted into a laminatable butterfly pouch 53. Butterfly pouch 53 may be of various types, for example, a pouch of the type described in U.S. Pat. No. 4,722,376, issued to the assignee of this application. As is conventional, the pouch is formed with tabs 55 attached to the panels of the pouch by lines of weakness such as perforations 57. The tabs are held together by an adhesive to hold the pouch closed until the core is ready to be inserted. With the core 51 inserted inside the pouch 53, the pouch and its contents are run through a conventional laminating machine to form a tamper resistant identification card 61 as shown in FIG. 7 of the drawings. The tabs 55 may be removed before, during or after the laminating process.

Figure 8:
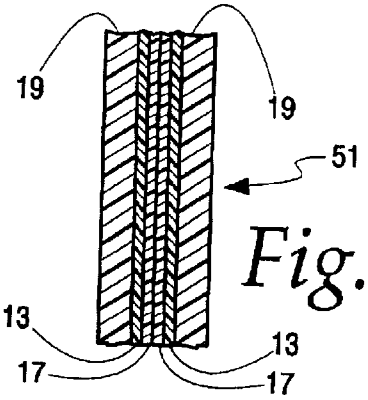
FIG. 8 is a cross sectional view of the finished laminated identification card with the thickness of the card exaggerated for purposes of illustration.

FIG. 8 of the drawings shows a cross section through the core 51 depicting the printed indicia bearing polyolefin film 19 positioned on the exterior faces of the core before insertion into the pouch 53.

The discrete sheets 31 can be supplied to those who apply photographs and identifying data to the panels 43 and 45, remove the printed panels from the discrete sheet 31, fold the connected panels about the line of weakness 47 to form the core 51, insert the core into a laminatable pouch 53 and run the assembly through a conventional laminating machine to create the tamper resistant identification card 61. An advantage of the pre-cut discrete sheet 31 is that a user can print panels with photos and text for one or more persons at a time. When the printing is completed, the discrete sheet 31 may be removed from the printer, the printed panels removed from the discrete sheet and the discrete sheet retained for printing on the unused panels.

What is claimed is:

1. A method of making a printed identification card core including the steps of:

extruding polyethylene onto one side of a release film, laminating a porous, printable polyolefin film to said polyethylene side of said release film, die cutting said porous, printable polyolefin film and said polyethylene film to form a plurality of rectangular bodies each having a die cut transversely extending fold line dividing each of said rectangular bodies into two identically sized rectangular panels, printing on said porous, printable polyolefin film within said panels, removing a rectangular body from said release sheet, and folding said rectangular body about said fold line to locate said printed polyolefin surfaces on the exterior of said core.

2. The method of claim 1 including the further steps of:

inserting said foldable core into a laminatable pouch, and laminating said pouch to said foldable core to form a tamper resistant identification card.

* * * * *